(12) United States Patent
Hosokawa et al.

(10) Patent No.: US 6,808,823 B2
(45) Date of Patent: Oct. 26, 2004

(54) MAGNETO-OPTICAL RECORDING MEDIUM AND MANUFACTURING METHOD THEREFOR

(75) Inventors: Tetsuo Hosokawa, Higashine (JP); Shin-ichiro Matsuo, Higashine (JP)

(73) Assignee: Fujitsu Limited, Kawasaki (JP)

( * ) Notice: Subject to any disclaimer, the term of this patent is extended or adjusted under 35 U.S.C. 154(b) by 57 days.

(21) Appl. No.: 09/880,347

(22) Filed: Jun. 13, 2001

(65) Prior Publication Data

US 2002/0110051 A1 Aug. 15, 2002

(30) Foreign Application Priority Data

Feb. 15, 2001 (JP) ........................................ 2001-037980

(51) Int. Cl.$^7$ ............................................. G11B 11/105
(52) U.S. Cl. ..................... 428/611; 428/637; 428/678; 428/686; 428/336; 428/694 RE; 428/964 EC; 428/694 GR; 369/13.44; 369/13.45; 369/13.46
(58) Field of Search ................................ 428/611, 636, 428/637, 668, 678, 686, 336, 694 RE, 694 MM, 694 EC, 694 GR, 693, 64.3, 64.4, 64.9, 65.3, 694 R, 694 IS, 694 T, 900; 369/13.44, 13.45, 13.46, 13.01, 13.02, 13.42, 13.5, 13.53

(56) References Cited

U.S. PATENT DOCUMENTS

| | | | |
|---|---|---|---|
| 5,563,852 A | 10/1996 | Murakami et al. ............ 369/13 |
| 5,633,838 A | 5/1997 | Hirokane et al. | |
| 5,684,764 A | 11/1997 | Hirokane et al. | |
| 5,691,963 A | 11/1997 | Hirokane et al. | |
| 5,719,829 A | 2/1998 | Nishimura | |
| 5,754,500 A * | 5/1998 | Tanaka et al. ............ 369/13.42 |
| 5,764,601 A | 6/1998 | Murakami et al. ............ 369/13 |
| 5,824,426 A | 10/1998 | Iketani et al. ................ 428/694 |
| 5,901,118 A | 5/1999 | Iketani et al. | |
| 5,922,177 A | 7/1999 | Iketani et al. ........... 204/192.15 |
| 6,020,079 A | 2/2000 | Matsumoto et al. ......... 428/694 |
| 6,125,083 A * | 9/2000 | Nishimura et al. ....... 369/13.46 |
| 6,356,516 B2 * | 3/2002 | Tamanoi et al. .......... 369/13.01 |
| 6,463,016 B1 * | 10/2002 | Hirokane et al. ......... 369/13.42 |
| 6,492,035 B1 | 12/2002 | Yamaguchi et al. | |
| 6,534,162 B1 * | 3/2003 | Hirokane et al. ......... 369/13.45 |
| 6,545,955 B1 * | 4/2003 | Iwara et al. .............. 369/13.42 |
| 6,590,836 B1 * | 7/2003 | Yamaguchi et al. .. 428/694 RE |

FOREIGN PATENT DOCUMENTS

| | | |
|---|---|---|
| EP | 0 498 440 | 8/1992 |
| EP | 0 788 099 | 8/1997 |
| EP | 0 965 987 | 12/1999 |
| JP | 581717 | 3/1992 |
| JP | 7220312 | 8/1995 |
| JP | 10162439 | 6/1998 |
| JP | 11203739 | 7/1999 |
| JP | 200076717 | 3/2000 |

* cited by examiner

*Primary Examiner*—Kevin M. Bernatz
(74) *Attorney, Agent, or Firm*—Greer, Burns & Crain, Ltd.

(57) ABSTRACT

A magneto-optical recording medium including a magnetic recording layer for recording information and a magnetic reproducing layer provided on the magnetic recording layer for reading information. The magnetic reproducing layer is separated into a first reproducing layer having a first composition and a second reproducing layer having a second composition slightly different from the first composition. The first and second reproducing layers have the same principal components. By changing a ratio in film thickness between the first and second reproducing layers, variations in composition of the first and second reproducing layers can be corrected.

8 Claims, 15 Drawing Sheets

MAGNETO-OPTICAL RECORDING MEDIUM AND MANUFACTURING METHOD THEREFOR

BACKGROUND OF THE INVENTION

1. Field of the Invention

The present invention relates generally to a recording medium allowing high-density recording and reproduction of information, and more particularly to a magneto-optical recording medium and a manufacturing method therefor.

2. Description of the Related Art

A magneto-optical disk is known as a high-density recording medium, and an increase in its recording density is demanded with an increase in quantity of information. Increasing the recording density of the medium can be realized by shortening the space between adjacent recording marks. However, the reproduction of each recording mark is limited by the size of a light beam (beam spot) on the medium. In the case that the density of the recording marks is set so that only one recording mark is present inside the beam spot, an output waveform corresponding to "1" or "0" can be observed as a reproduced signal according to whether or not the recording mark is present inside the beam spot.

However, in the case that the density of the recording marks is increased so that a plurality of recording marks are present inside the beam spot, the reproduced output does not change irrespective of movement of the beam spot on the medium, so that the output waveform becomes linear and the presence or absence of recording marks cannot be distinguished. The reproduction of such small recording marks having a period shorter than the size of the beam spot may be effected by reducing the size of the beam spot. However, the size of the beam spot is limited by the wavelength $\lambda$ of light output from a light source and the numerical aperture NA of an objective lens, so that the spot size cannot be sufficiently reduced.

Recently commercially available is a magneto-optical disk drive adopting a reproducing method using a magnetically induced super-resolution (MSR) technique for reproducing a recording mark smaller than the size of the beam spot by the use of an existing optical system. The MSR is a reproducing method such that while one mark present inside the beam spot is being reproduced, another mark is masked to thereby increase a reproductive resolution. Accordingly, such an MSR medium requires at least a mask layer or reproducing layer for masking the other mark so that the one mark is reproduced during signal reproduction, in addition to a recording layer for recording marks.

A magneto-optical recording medium using a perpendicularly magnetized film as the reproducing layer is proposed in Japanese Patent Laid-open No.3-88156, for example. In the prior art described in this publication, however, an initial magnetic field of several kilooersteds is required for initialization of the reproducing layer. Accordingly, the disk drive using this magneto-optical recording medium cannot be reduced in size. A magneto-optical recording medium using a magnetic film having an axis of easy magnetization in a longitudinal direction at room temperature and an axis of easy magnetization in a perpendicular direction at a predetermined temperature or higher as the reproducing layer is proposed in Japanese Patent Laid-open No. 5-81717, for example.

Further, an MSR medium having a reproducing layer, a recording layer, and an intermediate layer interposed between the reproducing layer and the recording layer is described in U.S. Pat. No. 6,020,079. In the MSR medium described in this U.S. patent, a reproducing laser beam is directed onto the medium to form a temperature distribution composed of a low-temperature region, an intermediate-temperature region, and a high-temperature region inside the beam spot. The low-temperature region and the high-temperature region form a double mask, and a recorded mark is read from only the intermediate-temperature region. Since the double mask is formed by the low-temperature region and the high-temperature region, the intermediate-temperature region for reading a recorded mark can be greatly reduced in size, thereby allowing high-density recording and reproduction. Such a magneto-optical recording medium is referred to as a double-mask rear aperture detection (DRAD) type magneto-optical recording medium.

Also known is an MSR medium having a nonmagnetic intermediate layer of SiN or the like between the reproducing layer and the recording layer. In this MSR medium, a temperature distribution composed of a low-temperature region and a high-temperature region is formed in a beam spot by directing a reproducing laser beam onto the medium, thereby forming a mask in the low-temperature region to read a recorded mark from the high-temperature region. This magneto-optical recording medium is referred to as a center aperture detection (CAD) type magneto-optical recording medium.

The DRAD type or CAD type MSR medium as mentioned above has an advantage such that the recording density is higher than that of the conventional magneto-optical medium, so that the storage capacity can be increased. However, the tolerance of the composition of the reproducing layer or the recording layer is narrow. In particular, it is a remarkable problem that the tolerance of the composition of the reproducing layer is narrow. The recording layer and the reproducing layer in a magneto-optical recording medium are generally formed by sputtering, and composition variations of about ±0.5 at % generally occur in normal sputter deposition. However, the tolerance of the composition in an MSR medium is narrower than ±0.5 at %, so that the characteristics of the medium become unstable and it is difficult to produce the MSR medium with its quality being maintained.

In general, each layer of a magneto-optical recording medium such as an MSR medium is formed by setting an alloy target in a deposition chamber of a stationary opposed type sputtering device and performing sputter deposition. The above-mentioned composition variations of about ±0.5 at % are considered to be due to a difference between individual alloy targets and an aged deterioration by the use of an alloy target.

As a method for solving this problem, it is known that a rare earth target of Gd or the like and a transition metal target of FeCo or the like are prepared and these two targets are set in the same deposition chamber to simultaneously perform sputtering. According to such a two-element simultaneous sputtering method, the composition of each layer can be adjusted by controlling sputter powers to be applied to the two targets, thereby allowing the correction of the composition variations due to the individual difference or aged deterioration of targets.

However, this two-element simultaneous sputtering method has problems that a sputtering device for carrying out this method becomes large in size and the availability is reduced, causing an increase in manufacturing cost. In contrast, the stationary opposed type sputtering device using alloy targets has an advantage such that the size of the device is small and the availability is high. However, in the conventional manufacturing method using the stationary opposed type sputtering device, the composition variations cannot be corrected.

SUMMARY OF THE INVENTION

It is therefore an object of the present invention to provide a low-cost and high-quality recording medium and a manufacturing method therefor.

It is another object of the present invention to provide a magneto-optical recording medium suitable for high-density recording which can reduce a reproducing magnetic field and a crosstalk and improve a C/N.

It is a further object of the present invention to provide a magneto-optical recording medium manufacturing method which can manufacture a high-quality magneto-optical recording medium at a low cost.

In accordance with an aspect of the present invention, there is provided a magneto-optical recording medium comprising a magnetic recording layer for recording information; and a magnetic reproducing layer provided on said magnetic recording layer for reading information; said magnetic reproducing layer comprising at least one first reproducing layer having a first composition and at least one second reproducing layer having a second composition slightly different from said first composition, said first and second reproducing layers having the same principal ingredients.

Preferably, said magnetic reproducing layer contains Gd, the difference in Gd composition between said first reproducing layer and said second reproducing layer being in the range of 0.5 to 3.0 at %. More preferably, the difference in said Gd composition is in the range of 0.7 to 2.0 at %. Preferably, said magnetic reproducing layer is composed of GdFeCo, and said Gd composition is in the range of 24.0 to 27.0 at %. Preferably, the total thickness of said first reproducing layer and said second reproducing layer is in the range of 35 to 60 nm. More preferably, this total thickness is in the range of 40 to 50 nm.

Preferably, the magneto-optical recording medium is a DRAD type magneto-optical recording medium having a magnetic intermediate layer between the magnetic recording layer and the magnetic reproducing layer. Alternatively, the magneto-optical recording medium is a CAD type magneto-optical recording medium having a nonmagnetic intermediate layer between the magnetic recording layer and the magnetic reproducing layer.

In accordance with another aspect of the present invention, there is provided a manufacturing method for a magneto-optical recording medium, comprising the steps of forming a first magnetic reproducing layer having a first composition by sputtering; forming a second magnetic reproducing layer having a second composition slightly different from said first composition on said first magnetic reproducing layer by sputtering, said first and second magnetic reproducing layers having the same principal ingredients; and forming a magnetic recording layer on said second magnetic reproducing layer by sputtering; variations in composition of said first and second magnetic reproducing layers being corrected by changing a ratio in film thickness between said first and second reproducing layers.

Preferably, the first and second magnetic reproducing layers and the magnetic recording layer are formed by using a stationary opposed type sputtering device. Preferably, each of said first and second magnetic reproducing layers is composed of GdFeCo, the composition of Gd contained in each of said first and second magnetic reproducing layers being in the range of 24.0 to 27.0 at %. More preferably, the difference in said Gd composition between said first magnetic reproducing layer and said second magnetic reproducing layer is in the range of 0.5 to 3.0 at %.

In accordance with a further aspect of the present invention, there is provided an information recording medium comprising at least one first recording layer having a first composition; and at least one second recording layer having the same principal ingredients as those of said first recording layer and a second composition slightly different from said first composition.

The present invention is applicable to a general information recording medium such as an optical disk and a magnetic disk. By changing a ratio in film thickness between said first and second reproducing layers, variations in composition of said first and second magnetic reproducing layers can be corrected.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
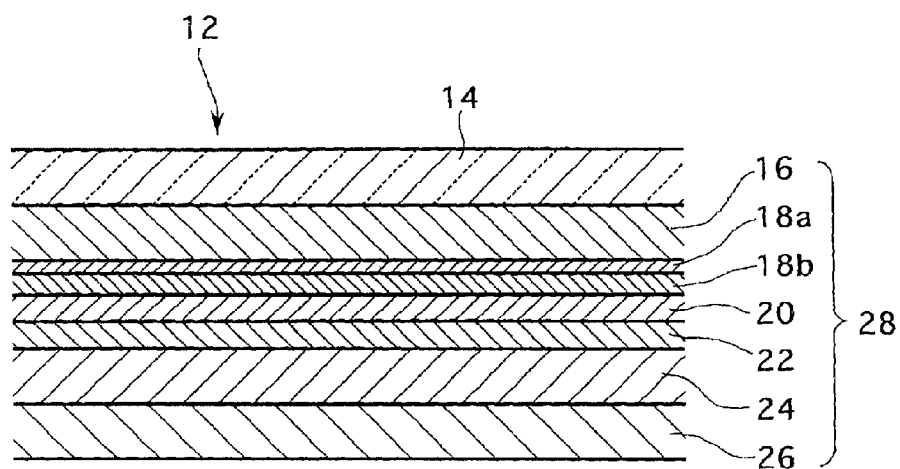
FIG. 1 is a vertical sectional view of a magneto-optical recording medium according to a first preferred embodiment of the present invention.
Figure 2:
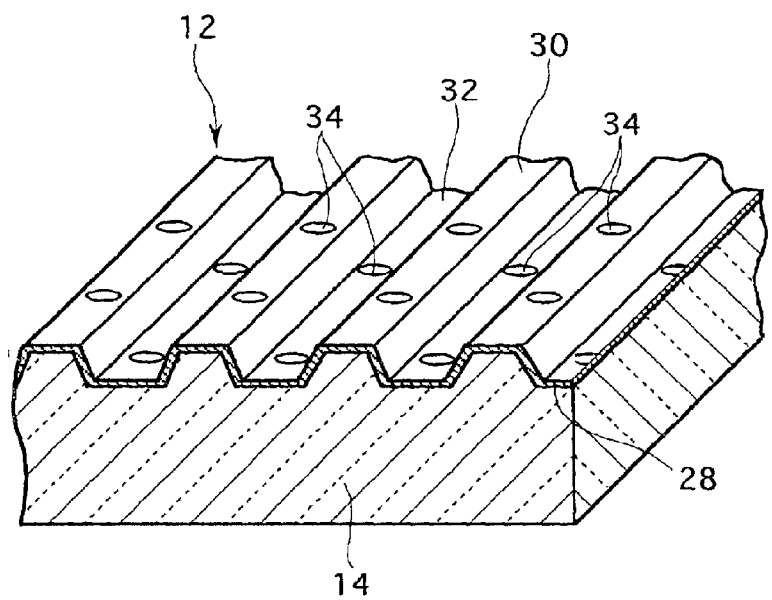
FIG. 2 is a fragmentary perspective view of a land/groove recording type magneto-optical recording medium.

Referring to FIG. 1, there is shown a sectional view of a magneto-optical recording medium 12 according to a first preferred embodiment of the present invention. The magneto-optical recording medium 12 has the form of a disk. Reference numeral 14 denotes a transparent substrate formed of glass or the like. As shown in FIG. 2, the transparent substrate 14 actually has a plurality of lands 30 and grooves 32 alternately formed. Specifically, a stamper having a positive resist film is used and it is exposed to a laser beam at a portion except a portion corresponding to grooves and pits for an ID signal. Then, the portion corresponding to the grooves and the pits is formed into a projecting portion by development and etching. Then, the stamper thus formed is mounted on a die of an injection molding machine, and a resin such as polycarbonate is supplied to the injection molding machine to thereby manufacture a transparent substrate of an optical recording medium.

Then, a recording layer, protective layer, reflective layer, etc. are formed on a transfer surface (a surface formed with the grooves and the pits) of the transparent substrate to thereby manufacture the optical recording medium. A manufacturing method for such a substrate is known in the art as described in the Prior Art of the specification of Japanese Patent Laid-open No. 11-232707, for example. In the case that the transparent substrate is formed of glass, a transfer layer for transferring the grooves and the pits by means of the above-mentioned stamper is formed on the transparent substrate, and the grooves and the pits of the stamper are transferred to the transfer layer of the substrate to thereby form the grooves and the lands.

A dielectric layer 16 of SiN or the like is formed on the transparent substrate 14 by sputtering, for example. The dielectric layer 16 prevents oxidation and corrosion of a magnetic layer formed thereon. Resins such as polycarbonate, polymethylmethacrylate, and amorphous polyolefin may also be adopted as the transparent substrate 14. Further, metal nitrides such as SiN, AlN, metal oxides such as $SiO_2$ and $Al_2O_3$, and metal sulfides such as ZnS may also be adopted as the dielectric layer 16.

A first magnetic reproducing layer 18a of GdFeCo is formed on the dielectric layer 16. The first magnetic reproducing layer 18a has a first composition. A second magnetic reproducing layer 18b of GdFeCo is formed on the first magnetic reproducing layer 18a. The second magnetic reproducing layer 18b has a second composition slightly different from the first composition. Each of the first and second magnetic reproducing layers 18a has an axis of easy magnetization in a direction perpendicular to its layer surface. Each of the first and second magnetic reproducing layers 18a and 18b is transition metal-dominant, or transition metal-rich such that the magnetic moment of transition metal is dominating over the magnetic moment of rare earth. Alternatively, one of the first and second magnetic reproducing layers 18a and 18b may be transition metal-rich and the other may be rare earth-rich. The Curie temperature of each of the first and second magnetic reproducing layers 18a and 18b is about 250° C. to about 300° C.

A magnetic intermediate layer 20 of GdFeCoSi is formed on the second magnetic reproducing layer 18b. The magnetic intermediate layer 20 has an axis of easy magnetization in a plane at room temperature. The axis (direction) of easy magnetization of the magnetic intermediate layer 20 changes from the in-plane direction to the perpendicular direction at a temperature higher than or equal to a predetermined temperature at which this layer 20 is heated by a reproducing beam power. As will be hereinafter described in detail, this predetermined temperature is preferably about 130° C. or more. The Curie temperature of the magnetic intermediate layer 20 is about 200° C. or less.

A magnetic recording layer 22 of TbFeCo is formed on the magnetic intermediate layer 20. The magnetic recording layer 22 has an axis of easy magnetization in a direction perpendicular to its layer surface. The Curie temperature of the magnetic recording layer 22 is about 250° C. to about 270° C. A protective layer 24 of SiN is formed on the magnetic recording layer 22. The protective layer 24 is provided for the purpose of preventing the entry of water or oxygen in the air or other substances such as halogen to protect the magnetic recording layer 22.

Metal nitrides such as SiN, AlN, metal oxides such as $SiO_2$ and $Al_2O_3$, and metal sulfides such as ZnS may also be adopted as the protective layer 24. Further, a recording sensitivity adjusting layer (reflective layer) 26 of aluminum (Al) is formed on the protective layer 24. Although not shown, a resin coating layer is formed on the recording sensitivity adjusting layer 26 for the purpose of protection. Thus, the magneto-optical recording medium 12 is completed. As mentioned above, the magneto-optical recording medium 12 is configured by forming on the transparent substrate 14 a multilayer film 28 including the dielectric layer 16, the first and second magnetic reproducing layers 18a and 18b, the magnetic intermediate layer 20, the magnetic recording layer 22, the protective layer 24, and the recording sensitivity adjusting layer 26.

Referring again to FIG. 2, the center distance (track pitch) between any adjacent ones of the lands 30 and the grooves 32 of the substrate 14 is 0.65 µm, and the multilayer film 28 is formed on the substrate 14. The level difference between the lands 30 and the grooves 32 of the substrate 14 is preferably in the range of 20 to 60 nm, e.g., 35 nm. Because the magneto-optical recording medium 12 is a magneto-optical recording medium having recording tracks consisting of both lands and grooves, a plurality of marks 34 are recorded on both the lands 30 and the grooves 32.

While a data erasing method, writing method, and reading method in the present invention are similar to those mentioned in U.S. Pat. No. 6,020,079 mentioned above, these methods will now be described in brief with reference to FIGS. 3 to 5. In the following description of these methods, it is assumed that the first and second reproducing layers 18a and 18b are formed as an integral reproducing layer 18.

Figure 3:
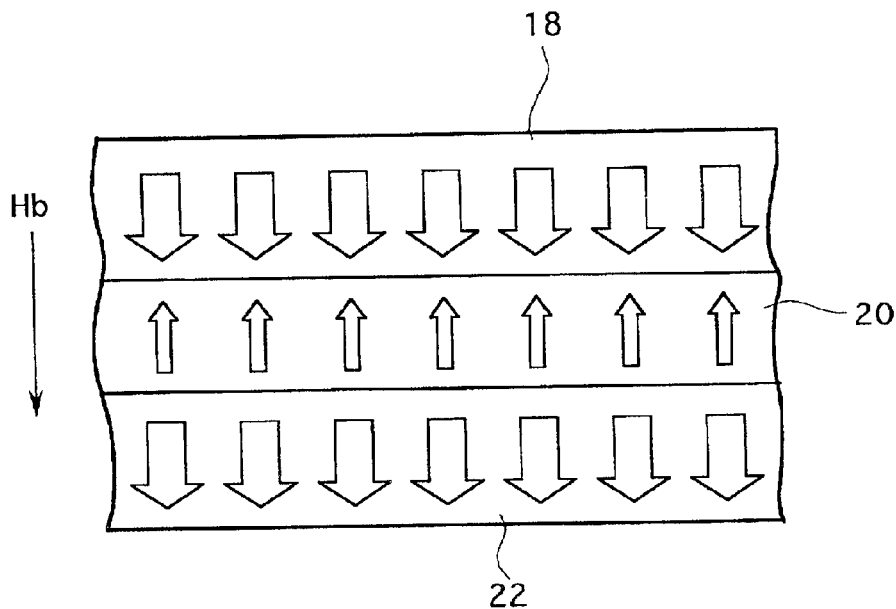
FIG. 3 is a vertical sectional view for illustrating data erasing in the present invention.

First, the data erasing method in the present invention will now be described with reference to FIG. 3. A laser beam is directed onto the recording medium as applying a bias magnetic field Hb in the downward direction to heat the recording layer 22 to a temperature higher than or equal to the Curie temperature of the recording layer 22, thereby ordering the magnetization in the recording layer 22 in the downward direction. When the recording medium is moved apart from the laser beam, the temperature of the recording medium lowers to room temperature. At room temperature, the magnetic coupling between the reproducing layer 18 and the recording layer 22 is weak. Accordingly, by applying a bias magnetic field Hb in the upward direction after erasing, the magnetization in the reproducing layer 18 is ordered in the downward direction by the exchange coupling with respect to the magnetization of FeCo in the intermediate layer 20. That is, while the magnetization direction in the intermediate layer 20 is upward as a whole, the magnetization direction of FeCo in the intermediate layer 20 is downward.

Figure 4:
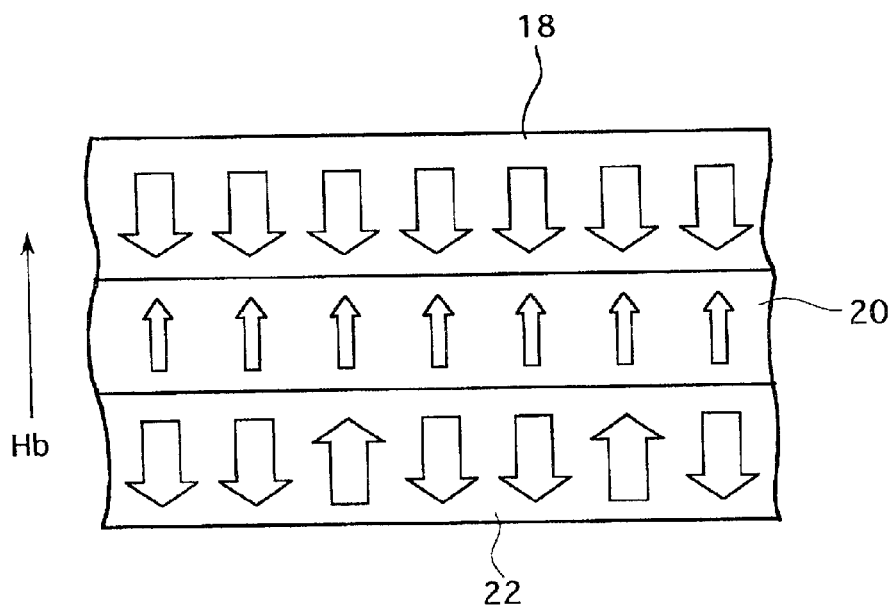
FIG. 4 is a vertical sectional view for illustrating data writing in the present invention.

The data writing method in the present invention will now be described with reference to FIG. 4. In writing data, an intense laser beam is directed onto only a recording portion on the medium as applying a bias magnetic field Hb in a direction opposite to the erasing direction, i.e., in the upward direction. As a result, the direction of the magnetization at only the recording portion is inverted to the upward direction. When the recording medium is moved apart from the laser beam, the temperature of the recording medium lowers to room temperature. At room temperature, the magnetic coupling between the reproducing layer 18 and the recording layer 22 is weak. Accordingly, the magnetization in the reproducing layer 18 is ordered in the downward direction by the exchange coupling with respect to the magnetization of FeCo in the intermediate layer 20.

The data double-mask reproducing method in the present invention will now be described with reference to FIGS. 5A and 5B. When a sufficiently intense reproducing laser beam is directed onto the recording medium, there are formed in a beam spot 38 a low-temperature region where the magnetization in the reproducing layer 18 is oriented in the downward direction by the exchange coupling with respect to the magnetization of FeCo in the intermediate layer 20, an intermediate-temperature region where the magnetization in the recording layer 22 is transferred to the intermediate layer 20 and the reproducing layer 18 by exchange coupling, and a high-temperature region where the temperature in this region is not less than the Curie temperature Tc of the intermediate layer 20 as shown in FIGS. 5A and 5B.

Figure 5A:
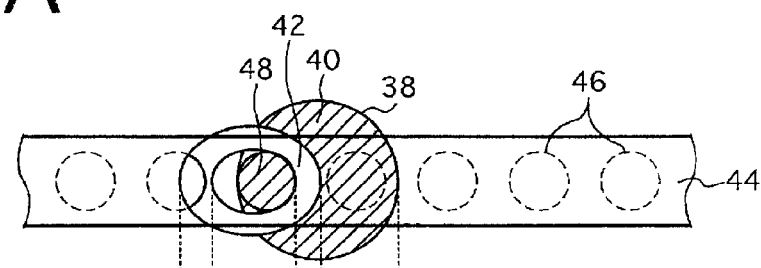
FIGS. 5A and 5B are a plan view and a vertical sectional view of a part of the recording medium, respectively, for illustrating a data reproducing method in the present invention.
Figure 5B:
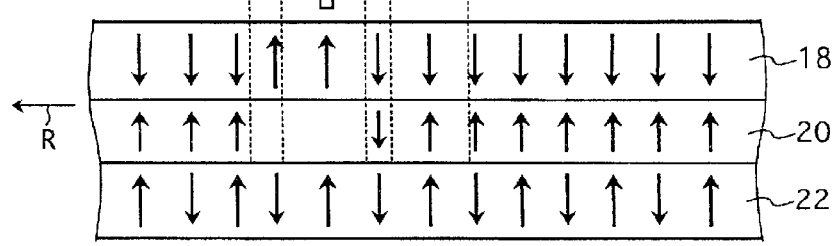

As shown in FIG. 5A, a plurality of marks 46 shown by the broken lines are formed in a track 44. In the high-temperature region, there is formed an up-spin mask 48 where the direction of the magnetization in the reproducing layer 18 coincides with the direction of the bias magnetic field Hr. An opening 42 is formed in the intermediate-temperature region between the two masks 40 and 48. At the up-spin mask 48, the recording medium is heated to a temperature not less than the Curie temperature Tc of the intermediate layer 20, so that the magnetization in the intermediate layer 20 disappears and the reproducing layer 18 and the recording layer 22 are not magnetically coupled with each other.

Accordingly, the magnetization in the reproducing layer 18 at the up-spin mask 48 is oriented in the direction of the reproducing bias magnetic field Hr because the reproducing layer 18 has a small coercive force at room temperature. That is, the direction of the magnetization in the reproducing layer 18 is always upward at a temperature not less than the Curie temperature Tc of the intermediate layer 20, and the reproducing layer 18 at the up-spin mask 48 functions as a kind of mask through which no magneto-optical signal is output. Accordingly, the very small opening 42 through which data recorded in the recording layer 22 is read can be formed. Further, the opening 42 is formed at a central portion of the beam spot 38 where the laser intensity is higher than that at an edge portion of the beam spot 38, so that a large magneto-optical signal can be obtained.

Figure 6:
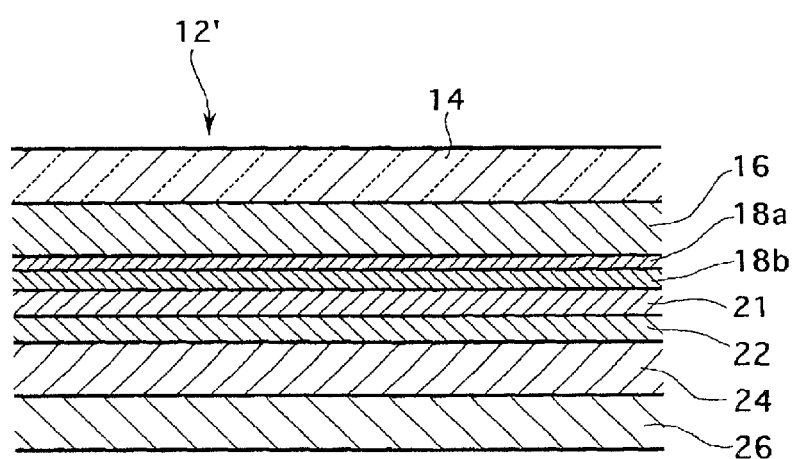
FIG. 6 is a vertical sectional view of a magneto-optical recording medium according to a second preferred embodiment of the present invention.

Referring to FIG. 6, there is shown a sectional view of a magneto-optical recording medium 12' according to a second preferred embodiment of the present invention. The magneto-optical recording medium 12' is a center aperture detection (CAD) type magneto-optical recording medium having a nonmagnetic intermediate layer 21 of SiN interposed between the second reproducing layer 18b and the recording layer 22. In the CAD type MSR magneto-optical recording medium 12', a temperature distribution composed of a low-temperature region and a high-temperature region is formed in a beam spot by directing a reproducing laser beam onto the medium 12', thereby forming a mask in the low-temperature region to read a recorded mark from the high-temperature region.

An experiment was performed on the magneto-optical recording medium 12 according to the first preferred embodiment to examine that the ratio in film thickness between the first reproducing layer 18a and the second reproducing layer 18b is changed to thereby correct variations in composition of the first and second reproducing layers 18a and 18b. A land/groove substrate with the center distance (track pitch) between adjacent land and groove set to 0.65 $\mu$m was prepared. The level difference between the land and the groove of this substrate was 35 nm falling in a preferable range of 30 to 70 nm. A stationary opposed type sputtering device having a plurality of deposition chambers (sputter chambers) each capable of achieving an ultimate vacuum of $5 \times 10^{-5}$ Pa or less was prepared.

First, the substrate was carried into the first chamber in which an Si target was mounted, and Ar gas and $N_2$ gas were introduced into the first chamber to deposit an SiN layer having a thickness of 90 nm on the substrate by reactive sputtering. The substrate was next moved into the second chamber in which a GdFeCo alloy target for the first reproducing layer 18a was mounted, and Ar gas was introduced into the second chamber to deposit the first reproducing layer 18a by DC sputtering. As the alloy target for the first reproducing layer 18a, the following two alloy targets having different compositions was prepared.

First alloy target having a composition of $Gd_{25.5}FeCo_{19.5}$

Second alloy target having a composition of $Gd_{26.0}FeCo_{19.5}$

The substrate was next moved into the third chamber in which a GdFeCo alloy target having the same principal ingredients as those of the alloy target for the first reproducing layer 18a and slightly different in Gd composition was mounted, and Ar gas was introduced into the third chamber to deposit the second reproducing layer 18b by DC sputtering. The deposition conditions for the first and second reproducing layers 18a and 18b were 5.0 Pa for Ar pressure and 5.5 nm/sec for sputter rate. As the alloy target for the second reproducing layer 18b, the following two alloy targets having different compositions were prepared.

Third alloy target having a composition of $Gd_{24.8}FeCo_{19.5}$

Fourth alloy target having a composition of $Gd_{24.3}FeCo_{19.5}$

By changing the sputter time for the first reproducing layer 18a and the second reproducing layer 18b, a plurality of samples having different film thickness ratios were deposited. In each sample, the total film thickness of the first reproducing layer 18a and the second reproducing layer 18b was set to 45 nm. The substrate was next moved into the fourth chamber in which a GdFeCoSi alloy target was mounted, and Ar gas was introduced into the fourth chamber to deposit an intermediate layer having a thickness of 40 nm. The deposition conditions for the intermediate layer were 4 Pa for Ar pressure and 8 nm/sec for sputter rate.

The substrate was next moved into the fifth chamber in which a TbFeCo alloy target was mounted, and Ar gas was introduced into the fifth chamber to deposit a recording layer having a thickness of 50 nm under the deposition conditions that the sputter rate was fixed to 7 nm/sec and the Ar pressure was fixed to 7 Pa. The substrate was next moved into the sixth chamber in which an Si target was mounted to deposit an SiN layer having a thickness of 25 nm on the recording layer under the same deposition conditions as those in the first chamber. The substrate was next moved into the seventh chamber in which an Al target was mounted to deposit an Al layer having a thickness of 20 nm. Finally, an organic protective layer is formed on the multilayer film deposited on the substrate as above by spin coating to prepare a plurality of DRAD type magneto-optical disks.

Figure 7:
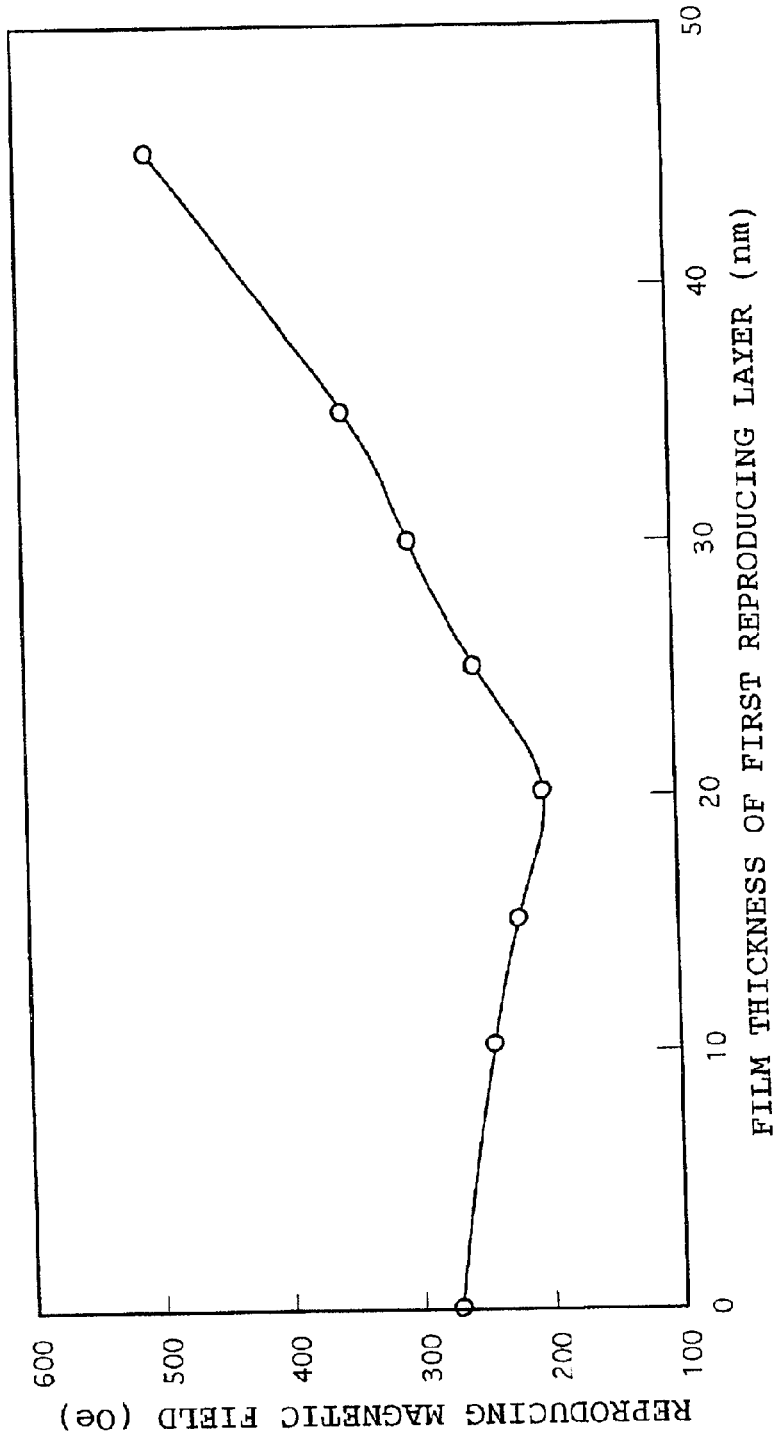
FIG. 7 is a graph showing the dependence of a reproducing magnetic field for rear mask formation upon a film thickness ratio in the present invention.
Figure 8:
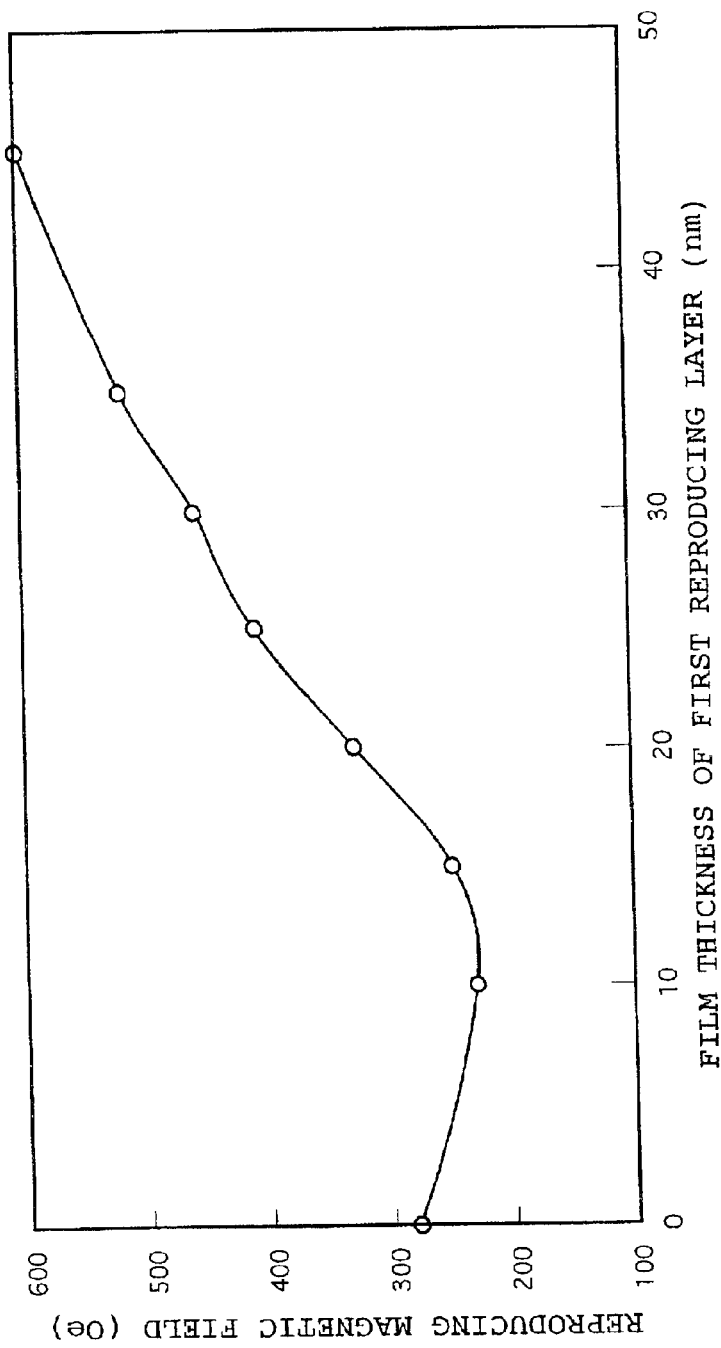
FIG. 8 is a graph showing the dependence of a reproducing magnetic field for rear mask formation upon a film thickness ratio in the present invention.
Figure 9:
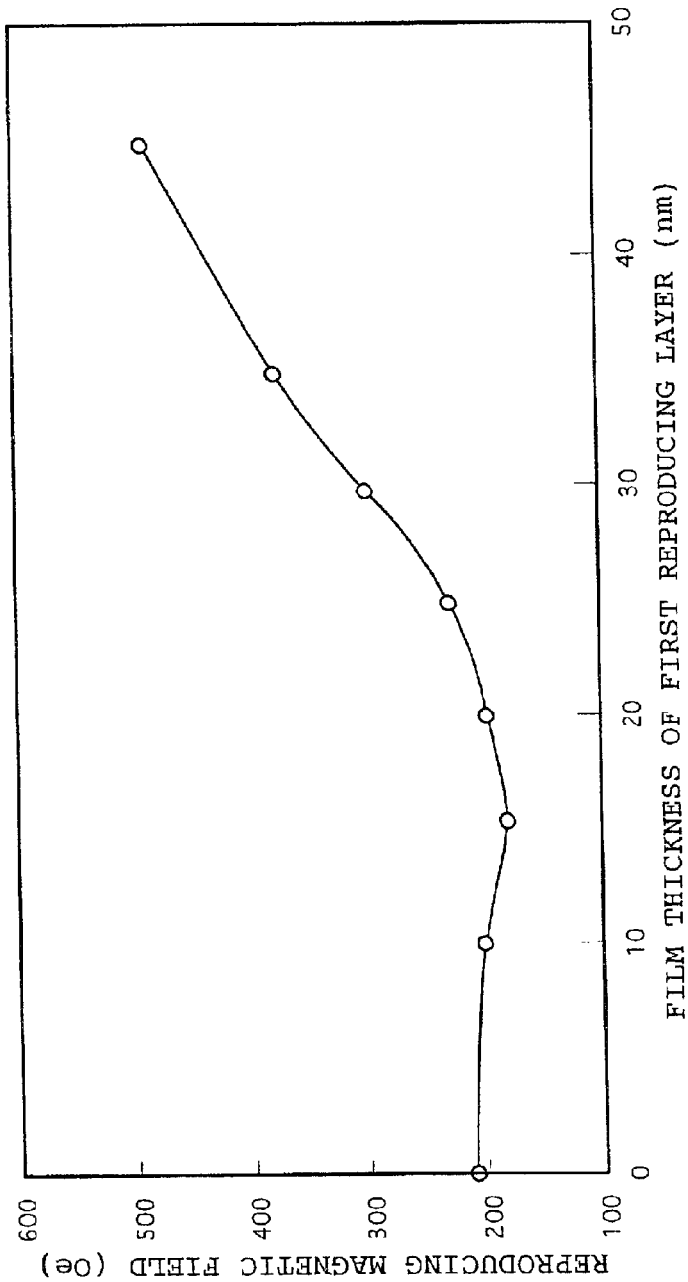
FIG. 9 is a graph showing the dependence of a reproducing magnetic field for rear mask formation upon a film thickness ratio in the present invention.

FIGS. 7, 8, and 9 show the dependence of a reproducing magnetic field for rear mask formation of the DRAD medium having two reproducing layers upon the film thickness ratio between the first and second reproducing layers as the results of evaluation on the various samples prepared above. More specifically, FIG. 7 shows the case that the first alloy target was used for the deposition of the first reproducing layer 18a and the third alloy target was used for the deposition of the second reproducing layer 18b. FIG. 8 shows the case that the second alloy target was used for the deposition of the first reproducing layer 18a and the third alloy target was used for the deposition of the second reproducing layer 18b. FIG. 9 shows the case that the first alloy target was used for the deposition of the first reproducing layer 18a and the fourth alloy target was used for the deposition of the second reproducing layer 18b.

Figure 12:
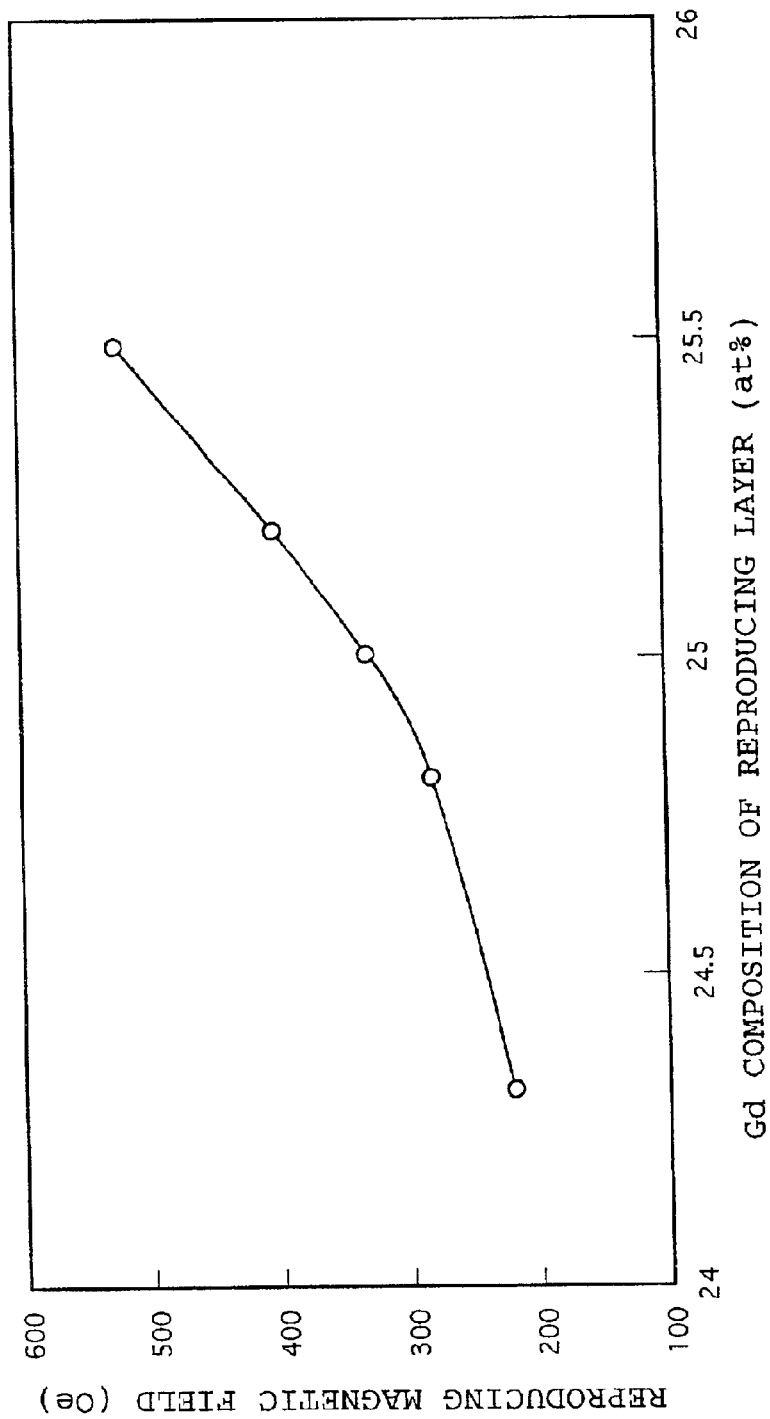
FIG. 12 is a graph showing the dependence of a reproducing magnetic field for rear mask formation upon a composition in the case of a single reproducing layer.

FIG. 12 shows the Gd composition dependence of a reproducing magnetic field for rear mask formation in the case that a conventional DRAD medium having a single reproducing layer was used. It is necessary to form not only a front mask but also a rear mask (a mask in a high-temperature region) for reproduction of information recorded on a DRAD medium. The magnetic field required for reproduction of information recorded on a DRAD type MSR medium becomes greater than or equal to a rear mask forming magnetic field. Each of the magneto-optical disks prepared above was set on a disk tester and rotated at a linear velocity of 7.5 m/sec to measure with a reproducing power of 3.5 mW. The magnetic field required for reproduction in a normal magneto-optical disk drive is 350 oersteds (Oe) or less.

Accordingly, in the conventional medium having a single reproducing layer, the Gd composition must be set to 25.1 at % or less as apparent from FIG. 12. However, when the Gd composition is set to 25.1 at % or less, the crosstalk (leakage C/N) becomes greater than or equal to 20 dB as a tolerance as apparent from FIG. 14. Therefore, the tolerance of the Gd composition in the reproducing layer must be controlled with an accuracy of about 0.1 at % to satisfy both the C/N and the crosstalk in the conventional medium. However, variations in composition of the target usually occur in the range of about ±0.5 at %, so that it is virtually impossible to manufacture the conventional medium having a single reproducing layer with its quality being stable. According to the present invention, it is possible to manufacture a high-quality DRAD type MSR medium at a low cost by separating the reproducing layer into two layers slightly different in Gd composition.

In FIG. 7, the white dot corresponding to a first reproducing layer thickness of 0 nm means that only the second reproducing layer 18b having a Gd composition of 24.8 at % is present, the white dot corresponding to a first reproducing layer thickness of 45 nm means that only the first reproducing layer 18a having a Gd composition of 25.5 at % is present, and the total film thickness of the first and second reproducing layers in the range of 0 to 45 nm for the first reproducing layer thickness is set to 45 nm. This relation is similarly applied to the cases of FIGS. 8 and 9 except that the Gd composition is different.

As apparent from FIGS. 7 to 9, the reproducing magnetic field can be controlled by controlling the film thickness ratio between the first and second reproducing layers 18a and 18b. The film thickness can be easily changed by adjusting the sputter time or sputter power. The film thickness is usually controllable with an accuracy of ±5 % or less. This accuracy corresponds to a variation of ±2 nm of the film thickness of the first reproducing layer 18a in FIGS. 7, 8, and 9. Thus, it is understood that the film thickness can be controlled with a sufficient accuracy. Although the compositions of the first reproducing layer 18a and the second reproducing layer 18b are varied, the film thickness ratio between the first and second reproducing layers can be changed by changing the sputter conditions such as the sputter time or sputter power, so that the characteristics of the reproducing layer as a whole can be adjusted.

Another effect obtained by separating the reproducing layer into two layers is that the reproducing magnetic field itself can be reduced. As apparent from FIGS. 7, 8, and 9, the rear mask forming magnetic field decreases in the range of 10 to 20 nm of the film thickness of the first reproducing layer 18a. This effect allows a reduction in reproducing magnetic field used in a magneto-optical disk drive. Alternatively, this effect may be utilized for enlargement of the margin of a reproducing laser power rather than for a reduction in reproducing magnetic field. This is due to the fact that the reproducing laser power and the reproducing magnetic field are in substantially inversely proportional relationship with each other, that is, the lower the reproducing laser power, the larger the reproducing magnetic field.

Figure 10:
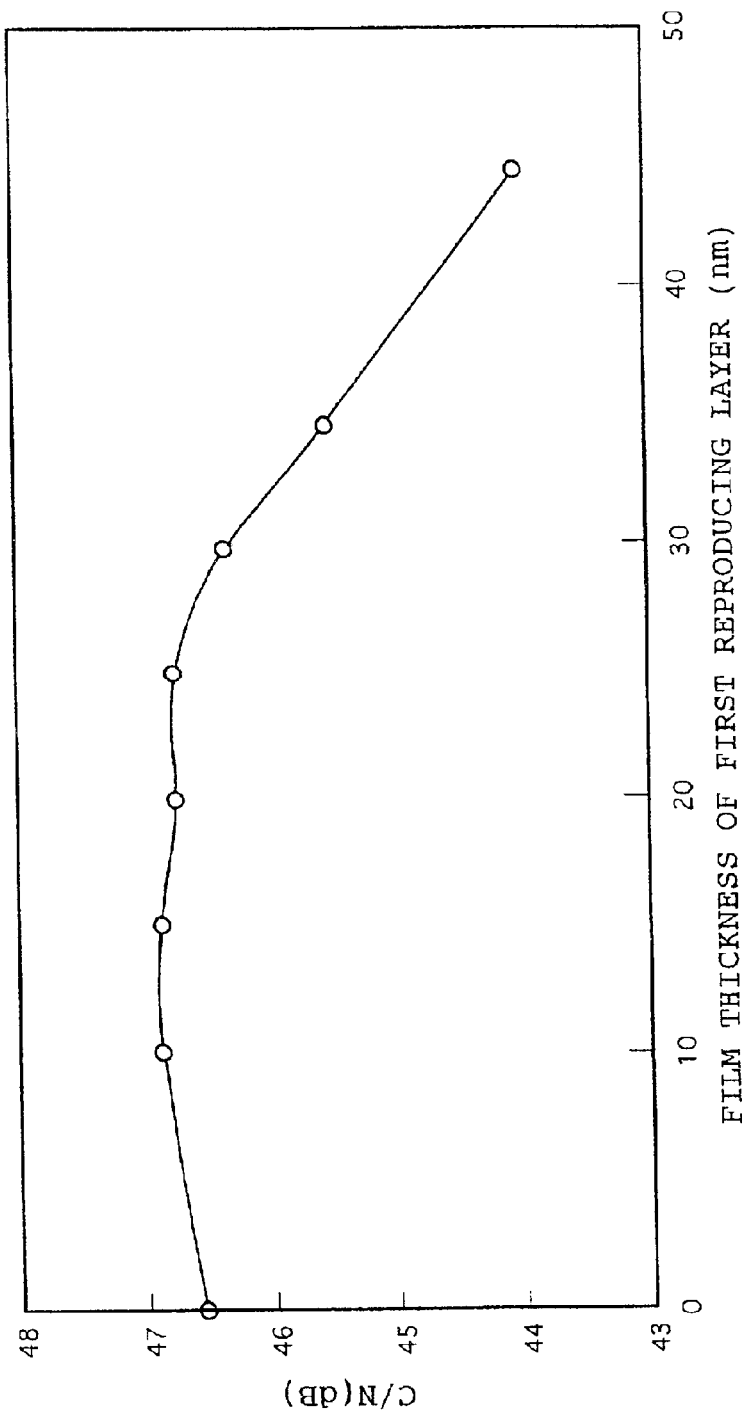
FIG. 10 is a graph showing the dependence of a C/N upon a film thickness ratio.
Figure 11:
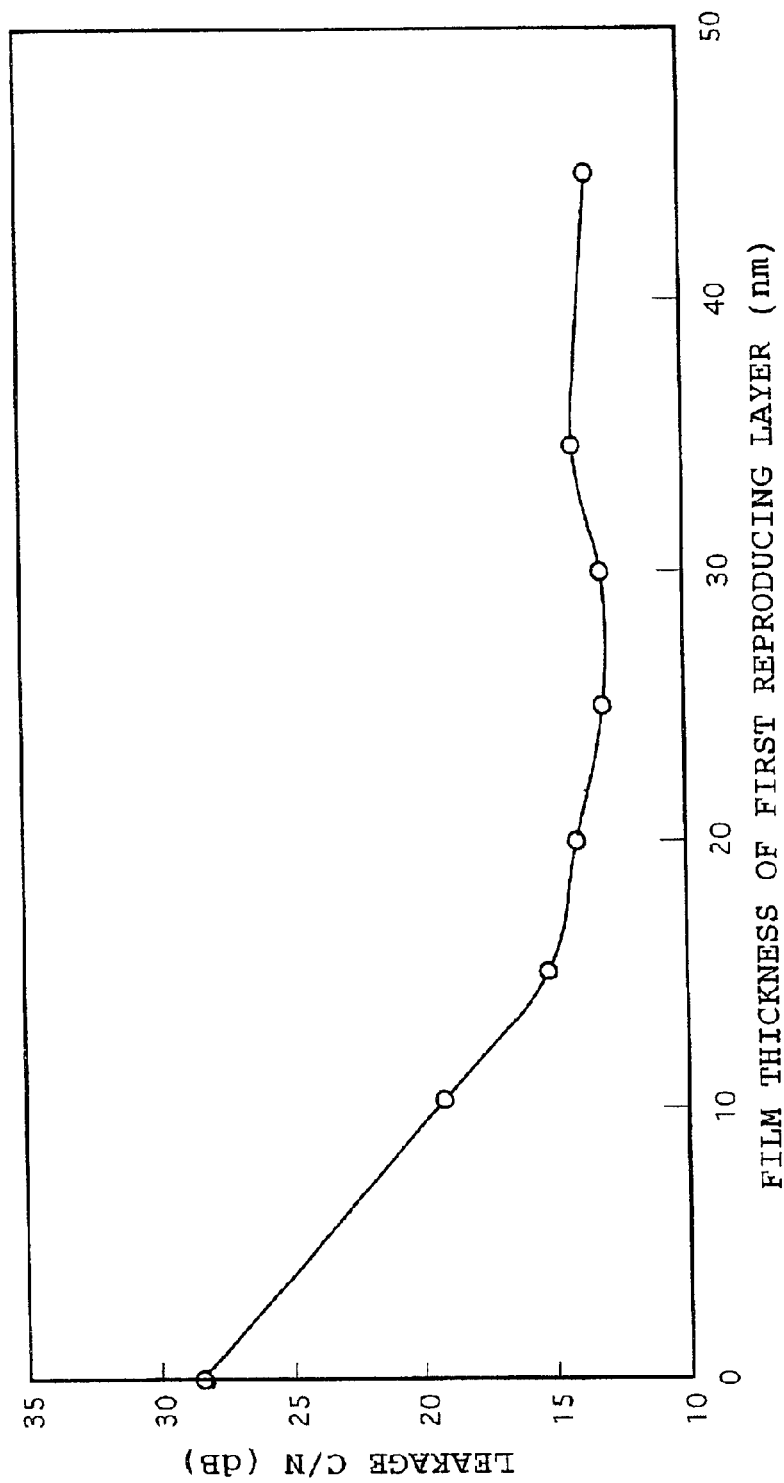
FIG. 11 is a graph showing the dependence of a crosstalk upon a film thickness ratio.

FIG. 10 shows the dependence of the C/N upon the film thickness ratio between the first and second reproducing layers in the case that the Gd composition of the first reproducing layer 18a was set to 25.5 at % and the Gd composition of the second reproducing layer 18b was set to 24.8 at %. FIG. 11 shows the dependence of the crosstalk upon the film thickness ratio between the first and second reproducing layers in the same case as the above. As apparent from FIGS. 7, 10, and 11, it is allowable to set the film thickness of the first reproducing layer 18a in the range of 10 to 30 nm in obtaining a reproducing magnetic field of 350 oersteds (Oe) or less, a C/N of 46 dB or more, and a crosstalk of 20 dB or less. This allowable range of the film thickness is a sufficient range even in consideration of variations in the film thickness during the course of manufacture. In the case that the compositions of the first reproducing layer 18a and/or the second reproducing layer 18b vary, the film thickness ratio between the first and second reproducing layers may be adjusted to thereby attain target characteristics.

Figure 13:
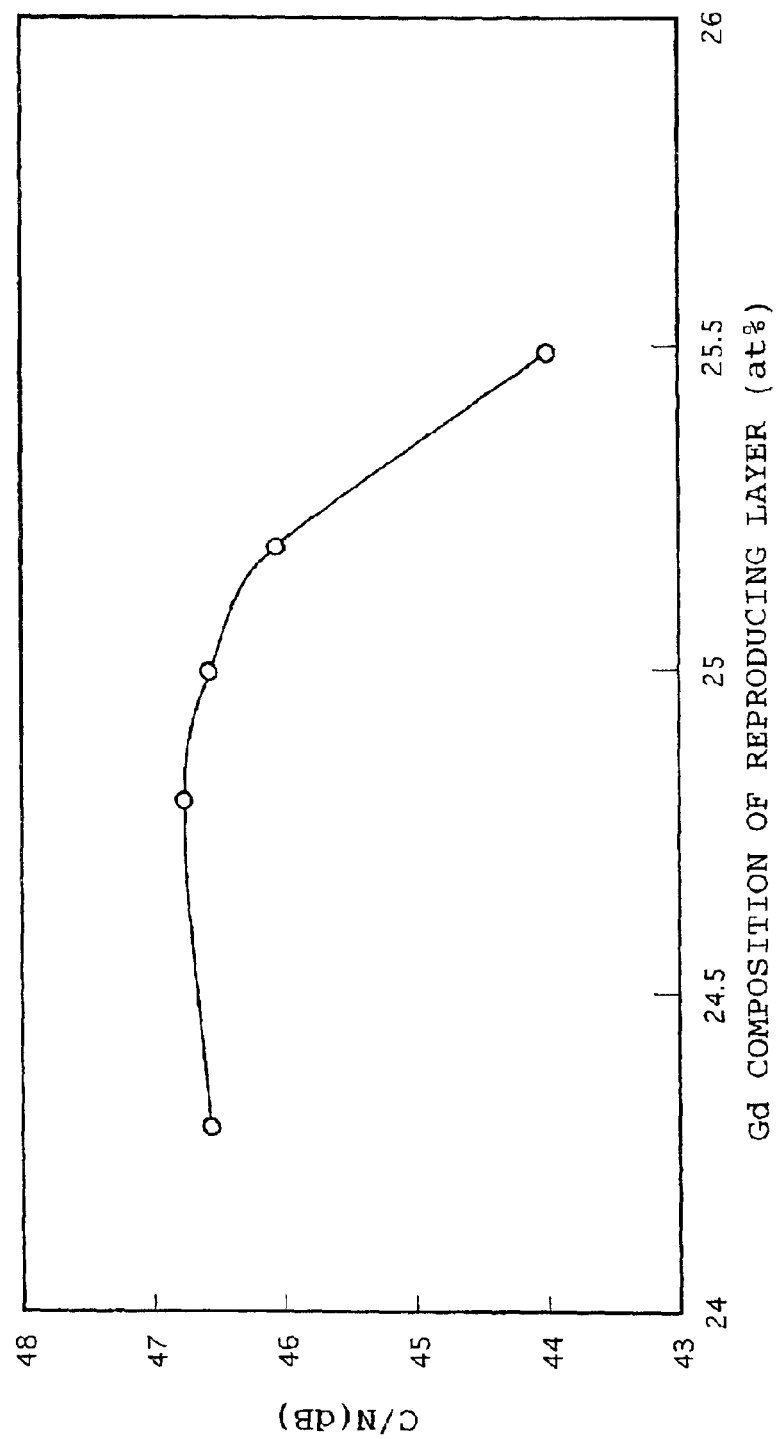
FIG. 13 is a graph showing the dependence of a C/N upon a composition in the case of a single reproducing layer.
Figure 14:
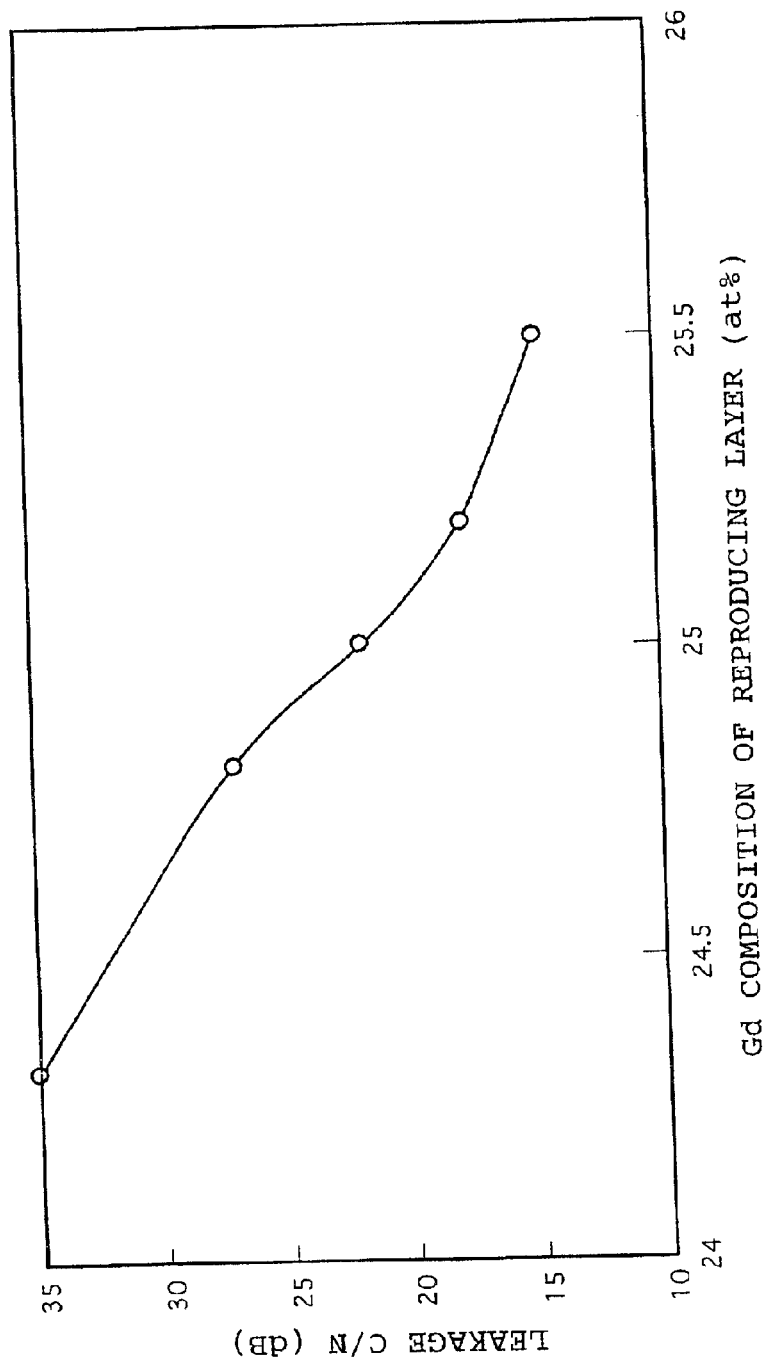
FIG. 14 is a graph showing the dependence of a crosstalk upon a composition in the case of a single reproducing layer.

On the other hand, as apparent from FIGS. 12, 13, and 14, there is almost no range of the Gd composition of the conventional single reproducing layer satisfying all of the reproducing magnetic field of 350 oersteds (Oe) or less, the C/N of 46 dB or more, and the crosstalk of 20 dB or less. This means that the Gd composition must be controlled very strictly to cause a great difficulty of manufacture of the medium.

Figure 15:
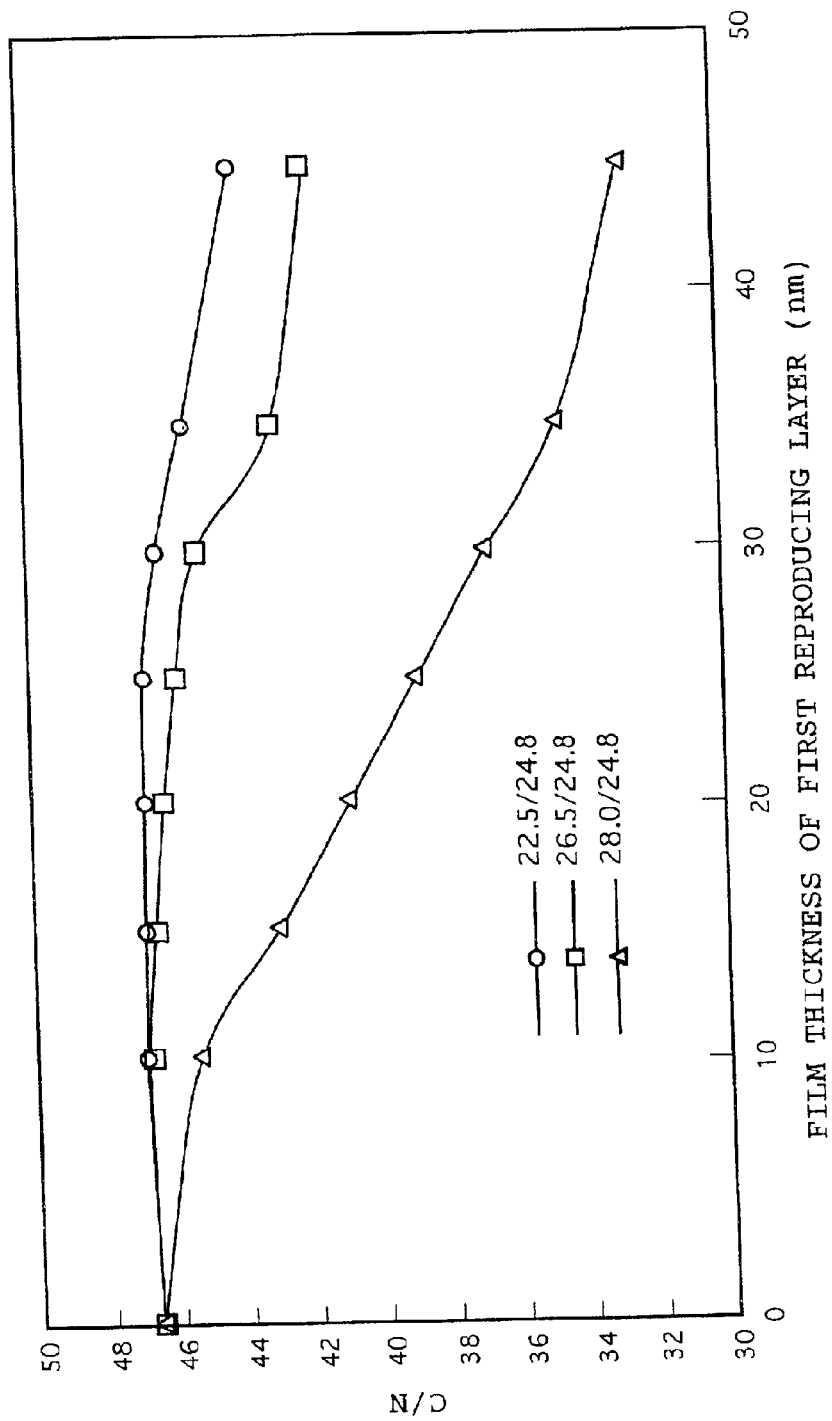
FIG. 15 is a graph showing the dependence of a C/N upon the composition of a first reproducing layer.
Figure 16:
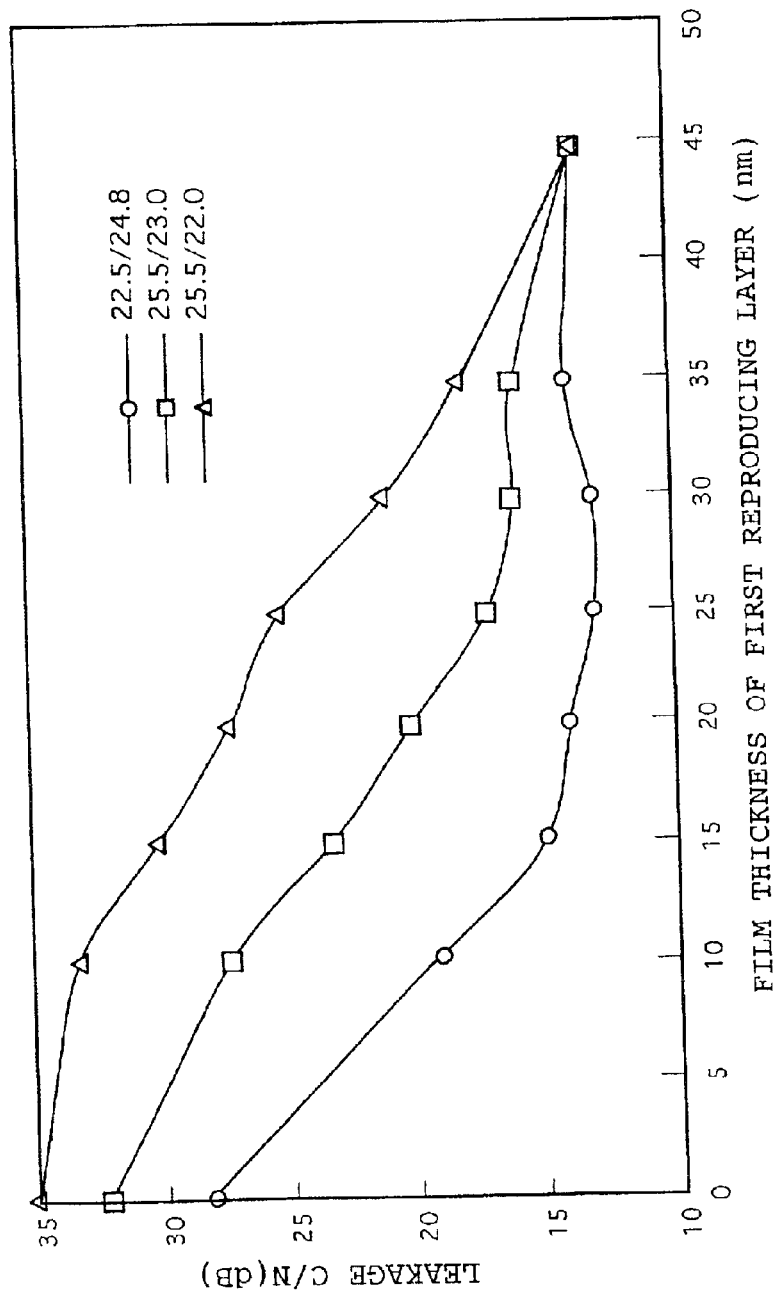
FIG. 16 is a graph showing the dependence of a crosstalk upon the composition of a second reproducing layer.

FIGS. 15 and 16 show the results in the case that the Gd compositions of the first and second reproducing layers 18a and 18b were changed more largely than those in the above case. As apparent from FIG. 15, when the Gd composition of the first reproducing layer 18a is deviated from the Gd composition of the second reproducing layer 18b by 3% or more, the C/N rapidly decreases with an increase in film thickness of the first reproducing layer 18a. In FIGS. 15 and 16, the numerator of each fraction indicates the Gd composition of the first reproducing layer 18a, and the denominator of each fraction indicates the Gd composition of the second reproducing layer 18b. As apparent from FIG. 16, when the Gd composition of the second reproducing layer 18b is deviated from the Gd composition of the first reproducing layer 18a by 2 at % or more, the crosstalk rapidly increases. Accordingly, the difference in Gd composition between the first reproducing layer 18a and the second reproducing layer 18b is set preferably in the range of 0.5 to 3.0 at %, more preferably in the range of 0.7 to 2.0 at %. Further, the Gd composition of each of the first and second reproducing layers 18a and 18b is set preferably in the range of 24.0 to 27.0 at %.

Figure 17:
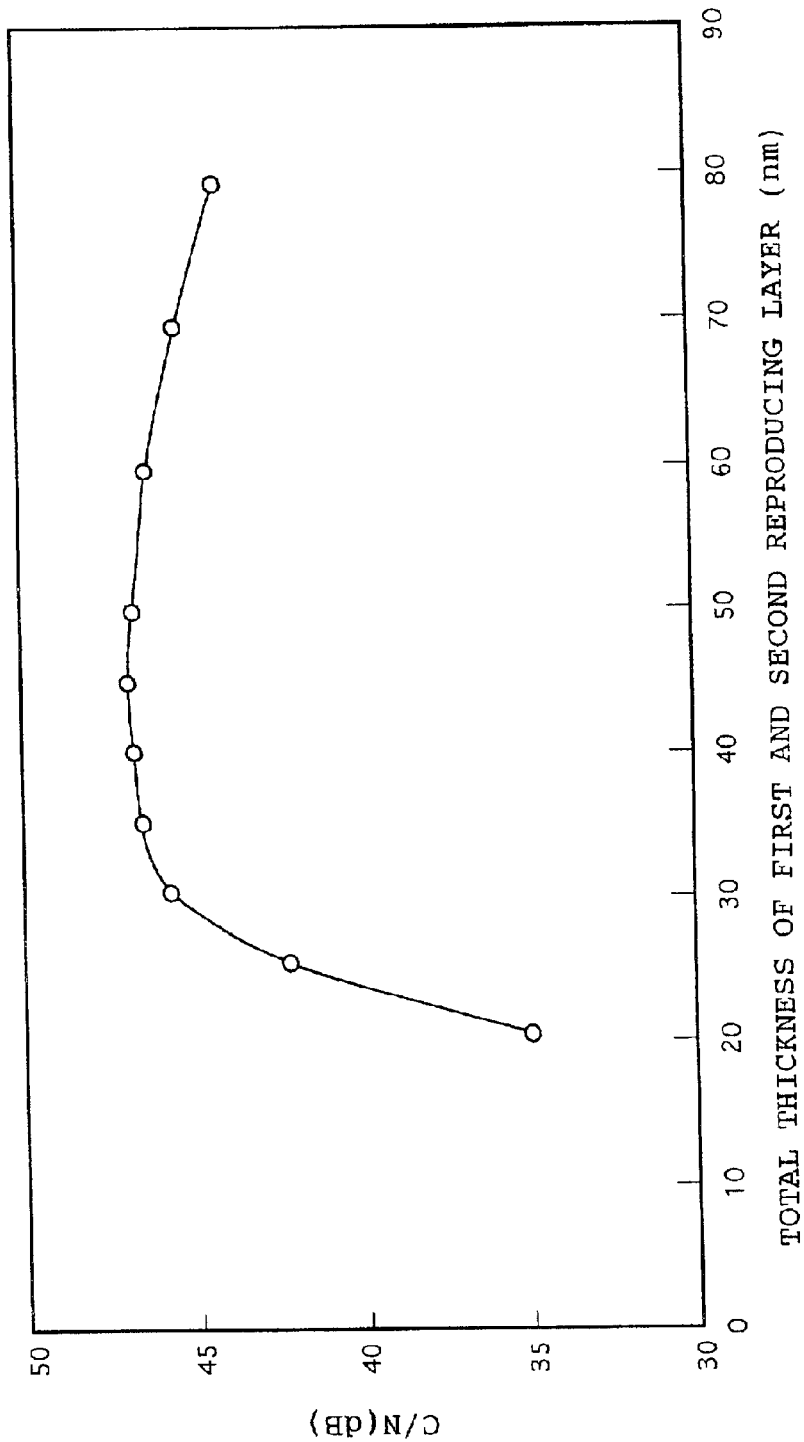
FIG. 17 is a graph showing the dependence of a C/N upon the total film thickness of the first and second reproducing layers.

FIG. 17 shows the dependence of the C/N upon the total film thickness of the first and second reproducing layers in the case that the Gd composition of the first reproducing layer 18a was set to 25.5 at %, the Gd composition of the second reproducing layer 18b was set to 24.8 at %, and the film thickness ratio between the first reproducing layer 18a and the second reproducing layer 18b was set to 20:25. As apparent from FIG. 17, the total film thickness of the first and second reproducing layers is set preferably in the range of 35 to 60 nm, more preferably in the range of 40 to 50 nm. While the reproducing layer is separated into the first and second reproducing layers 18a and 18b in each of the above preferred embodiments, a plurality of first and second reproducing layers may be alternately laminated. Further, the reproducing layer may be formed as multiple layers having slightly different compositions.

The present invention may be applicable also to the recording layer 22. In the case of separating the recording layer 22 into a plurality of layers, the composition variations can be corrected by changing the film thickness ratio of the separated recording layers. Further, while the Gd composition in each reproducing layer is changed in the above preferred embodiments, the rare earth element is not limited to Gd, but in the case that any other rare earth elements such as Tb are contained in each reproducing layer, the compositions of these elements may be changed.

Further, the principle of the present invention is applicable not only to a magneto-optical recording medium, but also to a general information recording medium having a recording layer such as a magnetic disk and an optical disk. That is, by separating the recording layer into first and second recording layers having slightly different compositions, and changing the film thickness ratio of the first and second recording layers, variations in composition of the first and second recording layers can be corrected.

According to the present invention as described above, it is possible to manufacture a magneto-optical recording medium having a reduced tolerance of composition varia-tions with a high quality being maintained at a low cost. In a DRAD type magneto-optical recording medium, a reproducing magnetic field can be reduced. Furthermore, according to the present invention, in a general information recording medium having a recording layer with a reduced tolerance of composition variations, the composition variations of the recording layer can be corrected by separating the recording layer into two layers having slightly different compositions and changing the film thickness ratio of the two layers.

What is claimed is:

1. A magneto-optical recording medium comprising:

a magnetic recording layer for recording information; and a magnetic reproducing layer provided on said magnetic recording layer for reading information and an intermediate layer provided between said magnetic recording layer and said reproducing layer;

said magnetic reproducing layer comprising at least one first reproducing layer having a first composition and at least one second reproducing layer having a second composition slightly different from said first composition, said first and second reproducing layers having the same principal ingredients, each of said first and second reproducing layers having perpendicular magnetization at room temperature and a Curie temperature of between approximately 250° C. and approximately 300° C., said first reproducing layer and said second reproducing layer being formed as an integral layer, said magnetic reproducing layer including Gd, wherein a difference in Gd composition between said first reproducing layer and said second reproducing layer is in the range of 0.5 to 3.0 at %.

2. A magneto-optical recording medium according to claim 1, wherein said intermediate layer is a magnetic intermediate layer.

3. A magneto-optical recording medium according to claim 1, wherein said intermediate layer is a nonmagnetic intermediate layer.

4. A magneto-optical recording medium according to claim 1, wherein the difference in said Gd composition is in the range of 0.7 to 2.0 at %.

5. A magneto-optical recording medium according to claim 1, wherein said magnetic reproducing layer is composed of GdFeCo.

6. A magneto-optical recording medium according to claim 5, wherein said Gd composition is in the range of 24.0 to 27.0 at %.

7. A magneto-optical recording medium according to claim 1, wherein the total thickness of said first reproducing layer and said second reproducing layer is in the range of 35 to 60 nm.

8. A magneto-optical recording medium according to claim 7, wherein the total thickness of said first reproducing layer and said second reproducing layer is in the range of 40 to 50 nm.

* * * * *